United States Patent
Inagi

(10) Patent No.: US 7,586,845 B2
(45) Date of Patent: Sep. 8, 2009

(54) BUTTON TELEPHONE APPARATUS AND VOICE COMMUNICATION CHANNEL CONTROL METHOD

(75) Inventor: Bunichi Inagi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 230 days.

(21) Appl. No.: 11/386,769

(22) Filed: Mar. 23, 2006

(65) Prior Publication Data
US 2006/0215639 A1     Sep. 28, 2006

(30) Foreign Application Priority Data
Mar. 25, 2005   (JP)   ............... 2005-088614

(51) Int. Cl.
H04L 1/00 (2006.01)
(52) U.S. Cl. ....................... 370/232; 370/235
(58) Field of Classification Search .............. 379/93.01; 370/232, 230.1, 468, 395.52, 352, 477, 329, 370/335, 336, 235
See application file for complete search history.

(56) References Cited

U.S. PATENT DOCUMENTS

| | | | | |
|---|---|---|---|---|
| 4,870,408 | A * | 9/1989 | Zdunek et al. | 370/341 |
| 5,428,608 | A * | 6/1995 | Freeman et al. | 370/261 |
| 5,661,718 | A * | 8/1997 | Bremer et al. | 370/207 |
| 6,307,839 | B1 * | 10/2001 | Gerszberg et al. | 370/235 |
| 6,466,586 | B1 * | 10/2002 | Darveau et al. | 370/468 |
| 6,522,730 | B1 * | 2/2003 | Timm et al. | 379/93.08 |
| 6,639,919 | B2 * | 10/2003 | Kroninger et al. | 370/464 |
| 6,728,238 | B1 * | 4/2004 | Long et al. | 370/352 |
| 6,771,637 | B1 * | 8/2004 | Suzuki et al. | 370/352 |
| 6,775,232 | B1 * | 8/2004 | Ah Sue et al. | 370/230.1 |
| 6,775,303 | B1 * | 8/2004 | Rustad et al. | 370/523 |
| 6,810,041 | B2 * | 10/2004 | Walker et al. | 370/397 |
| 6,873,597 | B1 * | 3/2005 | King | 370/235 |
| 6,965,768 | B1 * | 11/2005 | Keller et al. | 455/423 |
| 7,116,682 | B1 * | 10/2006 | Waclawsky et al. | 370/468 |
| 7,193,966 | B2 * | 3/2007 | Gupta et al. | 370/231 |
| 2002/0054597 | A1 * | 5/2002 | O'Toole et al. | 370/395.41 |
| 2004/0213204 | A1 * | 10/2004 | Yang | 370/352 |
| 2005/0135382 | A1 * | 6/2005 | Ross | 370/395.52 |
| 2007/0286237 | A1 * | 12/2007 | Mallya | 370/477 |
| 2008/0159366 | A1 * | 7/2008 | Tzannes et al. | 375/219 |

FOREIGN PATENT DOCUMENTS

| | | | |
|---|---|---|---|
| JP | 6-253352 | A | 9/1994 |
| JP | 2002-10331 | A | 1/2002 |
| JP | 2002-141938 | A | 5/2002 |
| JP | 2002-262345 | A | 9/2002 |
| JP | 2003-46563 | A | 2/2003 |

* cited by examiner

Primary Examiner—Olisa Anwah
(74) Attorney, Agent, or Firm—Sughrue Mion, PLLC

(57) ABSTRACT

A button telephone apparatus comprises an IP trunk for simultaneously making voice communication and data communication using the same communication line connected to an external IP network, and for monitoring the traffic of data-based packets in data communication, and a controller for increasing or decreasing the number of voice channels for making voice communication in accordance with a change in the traffic of data-based packets.

8 Claims, 2 Drawing Sheets

BUTTON TELEPHONE APPARATUS AND VOICE COMMUNICATION CHANNEL CONTROL METHOD

BACKGROUND OF THE INVENTION (1) Field of the Invention

The present invention relates to a button telephone apparatus which contains an IP (Internet Protocol) trunk.

(2) Description of the Related Art

Recently, there has been provided a system which integrates a voice network with a data network. Such a system employs an IP trunk (including a VoIP [Voice over Internet Protocol] unit) which can convert a voice into IP packets so that voice information can be transmitted and received on an IP network such as the Internet (see JP-A-2002-262345).

In an IP trunk connected to a broadband line such as an optical line, ADSL (Asymmetric Digital Subscriber Line) or the like, a plurality of voice communication channels can be set on a single line. In such an IP trunk, the number of voice channels is generally fixed.

However, the IP trunk having a fixed number of voice channels experiences a reduction in a band (or rate) for making voice communications as the traffic of data communications increases, resulting in a problem of a degraded voice quality due to echoes and delays which can occur in the voice communications.

JP-A-2002-262345 describes that more voice communications are achieved by temporarily using data communication channels for voice calls, as required. However, in this method, the data communication channels may be used for voice calls even if the traffic of data communications increases. Since the number of data communication channels is reduced in this way irrespective of the traffic of data communications, this method can suffer from such troubles as an inability to communicate data and the long amount of time required for data communications in some cases.

SUMMARY OF THE INVENTION

It is an object of the present invention to provide a button telephone apparatus and a voice communication channel control method which are capable of solving the problems mentioned above, preventing echoes and delays from occurring in voice communications resulting from increased traffic of data communications, and ensuring high-quality voice calls.

To achieve the above object, the button telephone apparatus of the present invention includes an IP trunk for simultaneously making voice communication and data communication using the same communication line connected to an external IP network, and for monitoring the traffic of data-based packets in data communication, and a controller configured to increase or decrease the number of voice channels for making voice communication in accordance with a change in the traffic of data-based packets. Specifically, the controller decreases the number of currently enabled voice channels when the traffic of data communication has increased. This results in the inability of the button telephone apparatus to make a new voice communication, and even if the traffic of data communication increases so that a band (rate) for making data communication erodes a band (rate) required for the number of enabled voice channels, a band (rate) required for voice communication can be ensured at all times, thus making it possible to prevent echoes and delays in voice-based packets. On the other hand, when the traffic of data communication has decreased, the controller increases the number of enabled voice channels. This permits the button telephone apparatus to accept a new voice communication.

As described above, according to the present invention, since a band (rate) required for voice communication can be ensured at all times even if the traffic of data-based packets varies, echoes and delays in voice-based packets can be prevented even if the traffic of data communication increases so as to cause the band (or rate) that provides for data communications to erode the band (rate) that is required for enabled voice channels. Consequently, the present invention can provide high-quality voice calls which have never been offered before.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
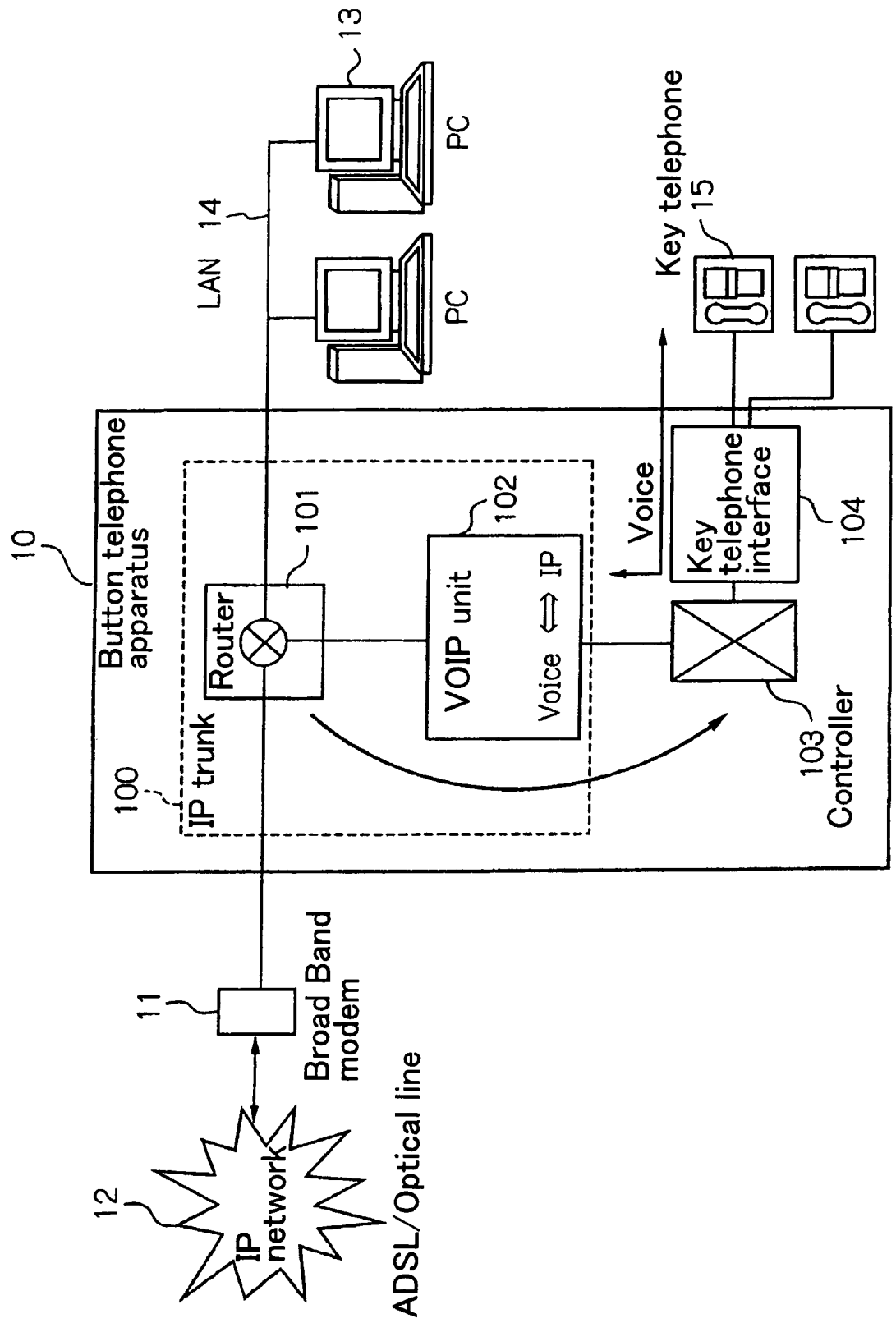
FIG. 1 is a block diagram generally illustrating the configuration of a button telephone apparatus according to one embodiment of the present invention.

FIG. 1 is a block diagram generally illustrating the configuration of a button telephone apparatus according to one embodiment of the present invention. Referring to FIG. 1, button telephone apparatus 10 comprises IP trunk 100, controller 103, and key telephone interface 104.

IP trunk 100 is capable of simultaneously making voice communication and data communication using the same communication line connected to IP network 12, such as an optical line, ADSL or the like. IP trunk 100 has router 101 and VoIP unit 102.

Router 101 has a first to a third port. The first port is connected to IP network 12 through broadband modem 11. The second port is connected to LAN 14 which is connected to terminal 13 such as a personal computer. The third port is connected to VoIP unit 102 for converting a voice to IP packets.

Router 101 sends data-based packets, supplied from IP network 12 to the first port through broadband modem 11, from the second port to LAN 14, and sends data-based packets, supplied from LAN 14 to the second port, from the first port to IP network 12 through broadband modem 11. Router 101 also supplies voice-based packets, supplied from IP network 12 to the first port through broadband modem 11, from the third port to VoIP unit 102, and sends voice-based packets, supplied from VoIP unit 102 to the third port, from the first port to IP network 12 through broadband modem 11. Otherwise, router 101 monitors at all times the amount of data-based packets sent from LAN 14 to IP network 12 in order to supply the amount of data-based packets for a given time to controller 103 through VoIP unit 102.

VoIP unit 102 is connected to key telephone interface 104 through controller 103. A plurality of key telephones 15 are connected to key telephone interface 104. VoIP unit 102 converts voice data from key telephone 15 to IP packets, and converts voice-based packets supplied from router 101 to voice data which can be received by key telephone 15.

Controller 103 increases or decreases the number of voice channels which are currently enabled for voice communication (hereinafter called the "number of enabled voice channels"), in accordance with the amount of data-based packets for a given time supplied from router 101 at fixed time intervals. Specifically, when the amount of data-based packets for a given time has increased to such an extent that the band that provides for data communications erodes the band that is required for enabled voice channels, controller 103 allows for good voice communications by limiting the number of enabled voice channels by reducing the their number. On the other hand, when the number of data-based packets for a given time has decreased, controller 103 increases the number of enabled voice channels. The band required for the number of enabled voice channels is given by:

[Band Required for One Channel (Line Rate)]×[Number of Enabled Voice Channels]

Generally, the band required for one channel is 64 kbps, and when data is compressed in IP trunk 100, a narrower band is allocated, such as 32 kbps, 16 kbps or the like.

Controller 103 comprises a memory which stores a channel state management table for managing the channel state (busy/idle) for the number of channels available for voice channels (the total number of voice channels (previously set fixed value)). Controller 103 controls variations in the number of available voice channels by setting the channel state (busy/idle) on the channel state management table. On the channel state management table, a voice channel currently enabled for use is set to a busy state, while other voice channels are set to an idle state. The number of busy voice channels on the channel state management table indicates the number of enabled voice channels.

Next, a description will be given of the operation of the button telephone apparatus according to this embodiment.

Figure 2:
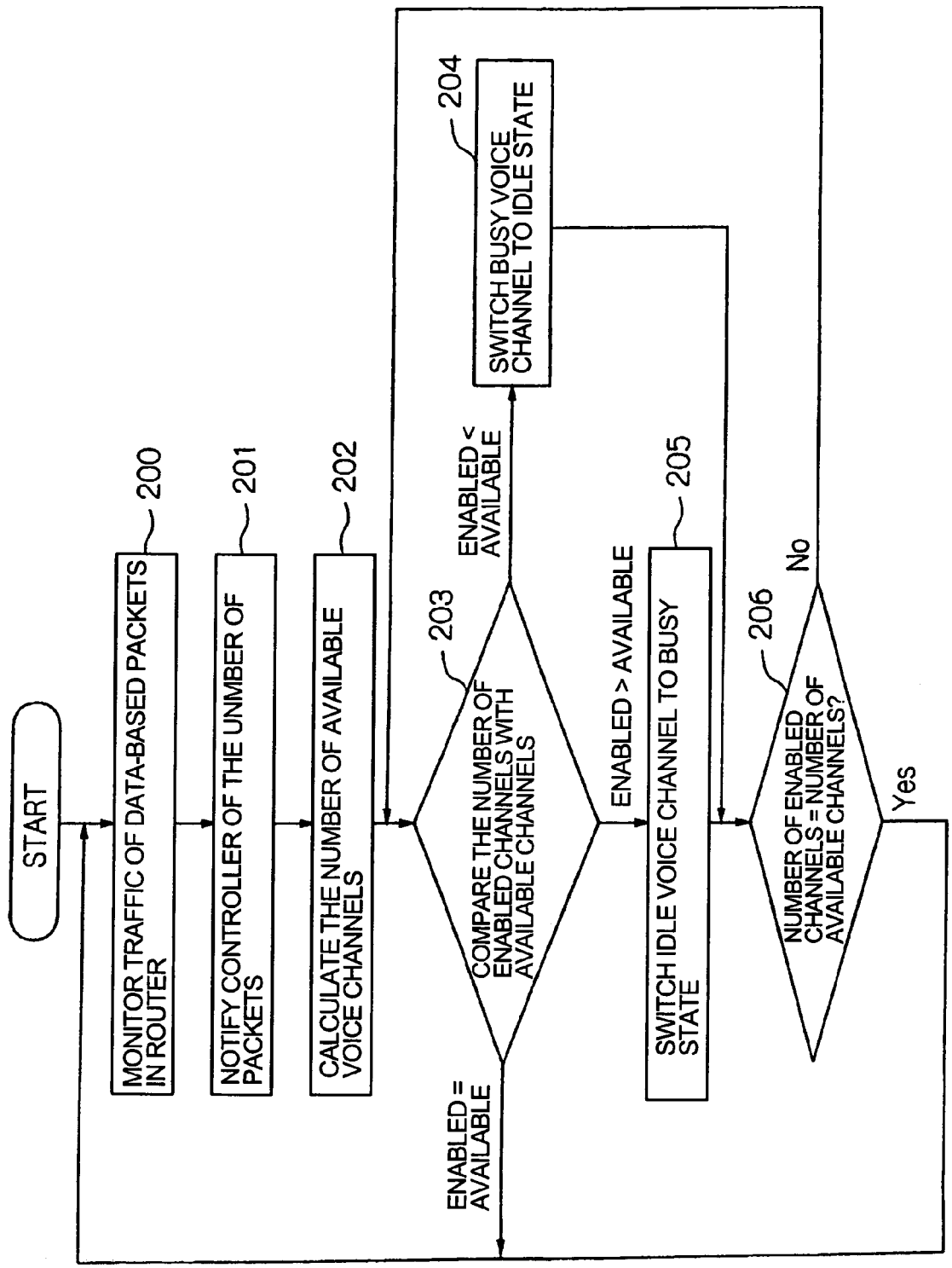
FIG. 2 is a flow chart showing a procedure for voice communication channel control that occurs in the button telephone apparatus illustrated in FIG. 1.

FIG. 2 shows a procedure for voice communication channel control that occurs in the button telephone apparatus illustrated in FIG. 1. First, router 101 monitors the amount of data-based packets supplied from LAN 14 (step 200), and supplies controller 103 with the amount of packets for a given time (step 201).

Next, controller 103 calculates the number of available voice channels (step 202). The number A of available voice channels is given by the following Equation 1:

$$A=(B1-B2)/B \quad \text{(Equation 1)}$$

where B1 represents a band (fixed) of a communication line through broadband modem 11; B2 represents a band currently used for data communications, and B represents a band (fixed) required for one channel. Here, band B2 can be calculated from the amount of packets for the given time, and the band required for one channel (line rate).

Next, controller 103 compares the number of enabled voice channels with the number of available voice channels calculated by Equation 1 (step 203). When the number of available voice channels is equal to number of enabled voice channels, the procedure returns to the aforementioned step 200.

When the number of available voice channels is larger than the number of enabled voice channels, controller 103 switches one of the busy voice channels to the idle state on the channel state management table (step 204). This results in an increase in the number of enabled voice channels by one.

When the number of available voice channels is smaller than the number of enabled voice channels, controller 103 switches one of the idle voice channels to the busy state on the channel state management table (step 205). This results in a decrease in the number of enabled voice channels by one.

After executing step 204 or step 205, controller 103 determines whether or not the increased or decreased number of enabled voice channels matches the number of available voice channels (step 206). The procedure returns to step 200 when they match, while the procedure returns to step 203 when they do not match.

According to the foregoing voice communication channel control, the number of voice channels available at the current time is known from the aforementioned Equation 1. In Equation 1, as the amount of data-based packets increases for a given time, band B2 that is used for data communications increases. Since band B1 of the communication line is fixed, an increase in band B2 results in a decrease in the band (B1−B2) that provides for voice communications, and a consequent reduction in the number of available voice channels. As the number of available voice channels decreases, the number of enabled voice channels is reduced by processing at step 205 so that new voice communications are not accepted. This operation results in an increase in the amount of data-based packets for the given time, thus making it possible to restrain echoes and delays in voice-based packets in a state where the band for making data communications erodes the band (rate) required for the number of enabled voice channels.

On the other hand, as the amount of data-based packets decreases for a given time, band B2 that is used for data communications also decreases. As a result, the band (B1−B2) that provides for voice communications increases, causing an increase in the number of available voice channels. As the number of available voice channels increases, the number of enabled voice channels is increased by processing at step 204. According to this operation, new voice communications can be accepted.

The button telephone apparatus of this embodiment described above is one example of the present invention, and can be modified in configuration and operation as appropriate without departing from the spirit and scope of the present invention. For example, in the configuration illustrated in FIG. 1, button telephone apparatus 10 may have a plurality of ports for connection to LAN.

Also, the LAN may be a wireless LAN.

Further, the router may be provided externally to the button telephone apparatus. In this configuration, the external router supplies the button telephone apparatus with the amount of data-based packets for a given time. An existing router may be used for the external router, in which case, however, the existing router must be provided with an interface which can deliver data communication related traffic information.

Also, in the procedure shown in FIG. 2, the number of enabled voice channels is increased or decreased by one at one step, but alternatively, a plurality of channels may be increased or decreased at one step. Also, the amount of data-based packets for a given time may be defined in several steps such that the number of voice channels is increased or decreased in accordance with a table which sets the number of voice channels that are to be increased or decreased at each of the steps.

While the foregoing description has been made in connection with a button telephone apparatus which uses an IP trunk with a built-in router, the configuration of the present invention can be applied to generally widely used VoIP systems in addition to the button telephone apparatus.

While preferred embodiments of the present invention have been described using specific terms, such description is for illustrates purposes only, and it is to be understood that changes and variations may be made without departing from the spirit or scope of the following claims.

What is claimed is:

1. A button telephone apparatus comprising:
an IP trunk for simultaneously making voice communication and data transmission using the same communication line connected to an external IP network, and monitoring traffic of data-based packets in data communication; and
a controller supplied with the result of monitoring from said IP trunk for increasing or decreasing the number of voice channels for making voice communication in accordance with a change in the traffic of data-based packets,
wherein:
said IP trunk comprises a router for relaying the data-based packets between an external data-based network for making data communication and the external IP network;
said router measures the traffic of data-based packets in data communication for a given time; and
said controller calculates a data communication rate currently used for data communication based on the traffic for the given time measured by said IP trunk, calculates the number of voice channels available for voice communication from the calculated data communication rate, the rate of the communication line, and a rate required for one channel of the communication line, and increases the number of enabled voice channels when the calculated number of available voice channels is larger than the number of currently enabled voice channels.

2. A button telephone apparatus comprising:
an IP trunk for simultaneously making voice communication and data transmission using the same communication line connected to an external IP network, and monitoring traffic of data-based packets in data communication; and
a controller supplied with the result of monitoring from said IP trunk for increasing or decreasing the number of voice channels for making voice communication in accordance with a change in the traffic of data-based packets,
wherein:
said IP trunk comprises a router for relaying the data-based packets between an external data-based network for making data communication and the external IP network;
said router measures the traffic of data-based packets in data communication for a given time; and
said controller calculates a data communication rate currently used for data communication based on the traffic for the given time measured by said IP trunk, calculates the number of voice channels available for voice communication from the calculated data communication rate, the rate of the communication line, and a rate required for one channel of the communication line, and decreases the number of enabled voice channels when the calculated number of available voice channels is smaller than the number of currently enabled voice channels.

3. A voice communication channel control method comprising:
a first step of simultaneously making voice communication and data communication using the same communication line connected to an external IP network;
a second step of monitoring traffic of data-based packets in data communication; and
a third step of increasing or decreasing the number of voice channels for making voice communications in accordance with a change in the traffic of data-based packets,
wherein:
said second step includes the step of measuring the traffic of data-based packets in data communication for a given time; and
said third step includes the steps of;
calculating a data communication rate currently used for data communication based on the measured traffic for the given time; and
calculating the number of voice channels available for voice communication from the data communication rate, the rate of the communication line, and a rate required for one channel of the communication line; and
increasing the number of currently enabled voice channels when the number of available voice channels is larger than the number of currently enabled voice channels.

4. A voice communication channel control method comprising:
a first step of simultaneously making voice communication and data communication using the same communication line connected to an external IP network;
a second step of monitoring traffic of data-based packets in data communication; and
a third step of increasing or decreasing the number of voice channels for making voice communications in accordance with a change in the traffic of data-based packets,
wherein:
said second step includes the step of measuring the traffic of data-based packets in data communication for a given time; and
said third step includes the steps of:
calculating a data communication rate currently used for data communication based on the measured traffic for the given time; and
calculating the number of voice channels available for voice communication from the data communication rate, the rate of the communication line, and a rate required for one channel of the communication line; and
decreasing the number of currently enabled voice channels when the number of available voice channels is smaller than the number of currently enabled voice channels.

5. The button telephone apparatus according to claim 2, wherein said button telephone apparatus is unable to make a new voice communication if the number of enabled voice channels is decreased.

6. The voice communication channel control method according to claim 4, wherein a new voice communication cannot be made if the number of currently enabled voice channels is decreased.

7. The button telephone apparatus according to claim 2, wherein said button telephone apparatus is inhibited from making a new voice communication if the number of enabled voice channels is decreased.

8. The voice communication channel control method according to claim 4, wherein a making of a new voice communication is inhibited if the number of currently enabled voice channels is decreased.

* * * * *